US011502993B2

(12) United States Patent
Bareket et al.

(10) Patent No.: US 11,502,993 B2
(45) Date of Patent: Nov. 15, 2022

(54) SCALABLE AND ON-DEMAND MULTI-TENANT AND MULTI REGION SECURE NETWORK

(71) Applicant: Perimeter 81 LTD, Tel-Aviv (IL)

(72) Inventors: Amit Bareket, Tel-Aviv (IL); Sagi Gidali, Rishon-LeZion (IL)

(73) Assignee: Perimeter 81 LTD, Tel-Aviv (IL)

( * ) Notice: Subject to any disclaimer, the term of this patent is extended or adjusted under 35 U.S.C. 154(b) by 169 days.

(21) Appl. No.: 16/988,777

(22) Filed: Aug. 10, 2020

(65) Prior Publication Data
US 2022/0045985 A1    Feb. 10, 2022

(51) Int. Cl.
| H04L 29/06 | (2006.01) |
| H04L 12/66 | (2006.01) |
| H04L 12/715 | (2013.01) |
| H04L 29/12 | (2006.01) |
| H04L 9/40 | (2022.01) |
| H04L 45/02 | (2022.01) |
| H04L 61/5007 | (2022.01) |

(52) U.S. Cl.
CPC .......... *H04L 63/0236* (2013.01); *H04L 12/66* (2013.01); *H04L 45/04* (2013.01); *H04L 61/5007* (2022.05); *H04L 63/029* (2013.01); *H04L 63/0272* (2013.01)

(58) Field of Classification Search
CPC ..... H04L 63/0236; H04L 12/66; H04L 45/04; H04L 61/2007; H04L 63/0272; H04L 63/029
See application file for complete search history.

(56) References Cited

U.S. PATENT DOCUMENTS

| 10,708,125 | B1* | 7/2020 | Chen | H04L 65/1046 |
| 2007/0299942 | A1* | 12/2007 | Lu | H04L 61/103 |
| | | | | 709/220 |
| 2013/0103811 | A1* | 4/2013 | Blaschke | H04L 61/5038 |
| | | | | 709/221 |
| 2016/0080195 | A1* | 3/2016 | Ramachandran | H04L 12/4641 |
| | | | | 370/220 |
| 2019/0182155 | A1* | 6/2019 | Chang | H04L 45/50 |
| 2021/0136031 | A1* | 5/2021 | Rong | H04L 12/4633 |

* cited by examiner

*Primary Examiner* — Christopher B Robinson

(57) ABSTRACT

Provided herein are systems and methods for configuring a segmented cloud based network based on separate Internet Protocol (IP) segments, comprising receiving instructions to create one or more additional private virtual networks as respective additional segments in a multi-tenant multi-regional cloud based network segmented to a plurality of segments each mapped by a respective IP address range, calculating one or more non-conflicting new IP address range based on analysis of the IP address range of each of the segments, allocating a respective new IP address range to each additional segment, and deploying automatically one or more gateways. The gateways are configured to connect one or more client devices to the additional segments) by assigning each client device an IP address in the respective new IP address range and routing network packets between the client devices and the respective additional segment according to mapping of the respective new IP address range.

13 Claims, 2 Drawing Sheets

SCALABLE AND ON-DEMAND MULTI-TENANT AND MULTI REGION SECURE NETWORK

FIELD AND BACKGROUND OF THE INVENTION

The present invention, in some embodiments thereof, relates to constructing a segmented multi-tenant multi-region cloud based network, and, more specifically, but not exclusively, to constructing a segmented multi-tenant multi-region cloud based network comprising multiple Internet Protocol (IP) address based private virtual networks to support Layer 3 (L3) up to Layer 7 (L7) networking infrastructure as a service for the private virtual networks.

With the rapid and overwhelming growth of cloud based services, platforms and infrastructures, as well as employees that are working from home and outside the office cloud networking is also gaining a constantly growing share in network deployment for a plurality of applications and infrastructures operated by a plurality of companies, organizations, institutions and/or the like.

Moreover, since cloud networking is offered as a service, for example, Network as a Service (NaaS) by several major information and technology companies, the cloud based networks have long become multi-tenant network environments in which multiple companies, organizations, institutions and/or the like may share the same platform to construct their own private, independent and isolated networks.

Constructing such multi-tenant networks in which each of the tenants may be allocated with private virtual networks that may be exclusively accessed and used by the respective tenant may naturally present major challenges in terms of privacy, security and/or the like.

SUMMARY OF THE INVENTION

According to a first aspect of the present invention there is provided a system for configuring a segmented cloud based network based on separate Internet Protocol (IP) segments, comprising one or more processors configured to:
  Receive instructions to create one or more additional private virtual networks as a respective additional segment in one or more multi-tenant multi-regional cloud based networks which is segmented to a plurality of segments each mapped by a respective IP address range.
  Calculate a non-conflicting new IP address range based on analysis of the IP address range of each of the plurality of segments of the one or more cloud based networks.
  Allocate the new IP address range to the respective additional segment.
  Deploy automatically one or more gateways configured to connect one or more of a plurality of client devices to the respective additional segment by assigning the one or more client devices an IP address in the new IP address range and routing network packets between the one or more client devices and the respective additional segment according to mapping of the new IP address range.

According to a second aspect of the present invention there is provided a computer implemented method of configuring a segmented cloud based network based on separate Internet Protocol (IP) segments, comprising using one or more processors configured for:
  Receiving instructions to create one or more additional private virtual networks as a respective additional segment in one or more multi-tenant multi-regional cloud based networks which is segmented to a plurality of segments each mapped by a respective IP address range.
  Calculating a non-conflicting new IP address range based on analysis of the IP address range of each of the plurality of segments of the one or more cloud based networks.
  Allocating the new IP address range to the respective additional segment.
  Deploying automatically one or more gateways configured to connect one or more of a plurality of client devices to the respective additional segment by assigning the one or more client devices an IP address in the new IP address range and routing network packets between the one or more client devices and the respective additional segment according to mapping of the new IP address range.

According to a third aspect of the present invention there is provided a computer readable medium comprising instructions executable by a computer, which, when executed by the computer, cause the computer to perform a method according to the second aspect.

In a further implementation form of the first, second and/or third aspects, one or more of the gateways are configured to apply Layer 2 (L2) routing to route the network packets between the one or more client device and the respective additional segment.

In a further implementation form of the first, second and/or third aspects, one or more of the gateways are configured to apply Layer 3 (L3) routing to route the network packets between the one or more client device and the respective additional segment.

In a further implementation form of the first, second and/or third aspects, one or more of the plurality of segments is further segmented to a plurality of subnets using Classless Inter-Domain Routing (CIDR).

In a further implementation form of the first, second and/or third aspects, one or more of the plurality of segments is further segmented to a plurality of subnets using one or more firewalls configured to route network traffic within the one or more segments according to one or more routing tables.

In a further implementation form of the first, second and/or third aspects, a plurality of gateways are deployed to provide connectivity to one or more of the plurality of segments for a plurality of client devices located at a plurality of geographical regions.

In a further implementation form of the first, second and/or third aspects, each of the plurality of gateways is deployed in one or more respective edge servers connected at an edge of the network in a respective one of the plurality of geographical regions in close network proximity to a respective access point providing network connectivity to the client devices located in the respective geographical region.

In a further implementation form of the first, second and/or third aspects, the plurality of gateways providing connectivity to the one or more segments for client devices located in the plurality of geographical regions are interconnected via one or more site to site secure connections.

In a further implementation form of the first, second and/or third aspects, the one or more processors are further configured to deploy automatically one or more additional gateway according to one or more predefined rules in response to a request received from one or more additional client devices to connect to one or more of the plurality of segments.

In a further implementation form of the first, second and/or third aspects, the one or more additional gateways are configured to connect the one or more additional client devices to the one or more segments by assigning the one or more additional client devices an IP address in the IP address range of the one or more segments and routing network packets between the one or more additional client devices and the one or more segments according to the mapping of the IP address range allocated to the one or more segments.

In a further implementation form of the first, second and/or third aspects, the one or more additional gateways are deployed in one or more of a plurality of geographical regions supported by the one or more cloud based networks in which the one or more additional client devices is located.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
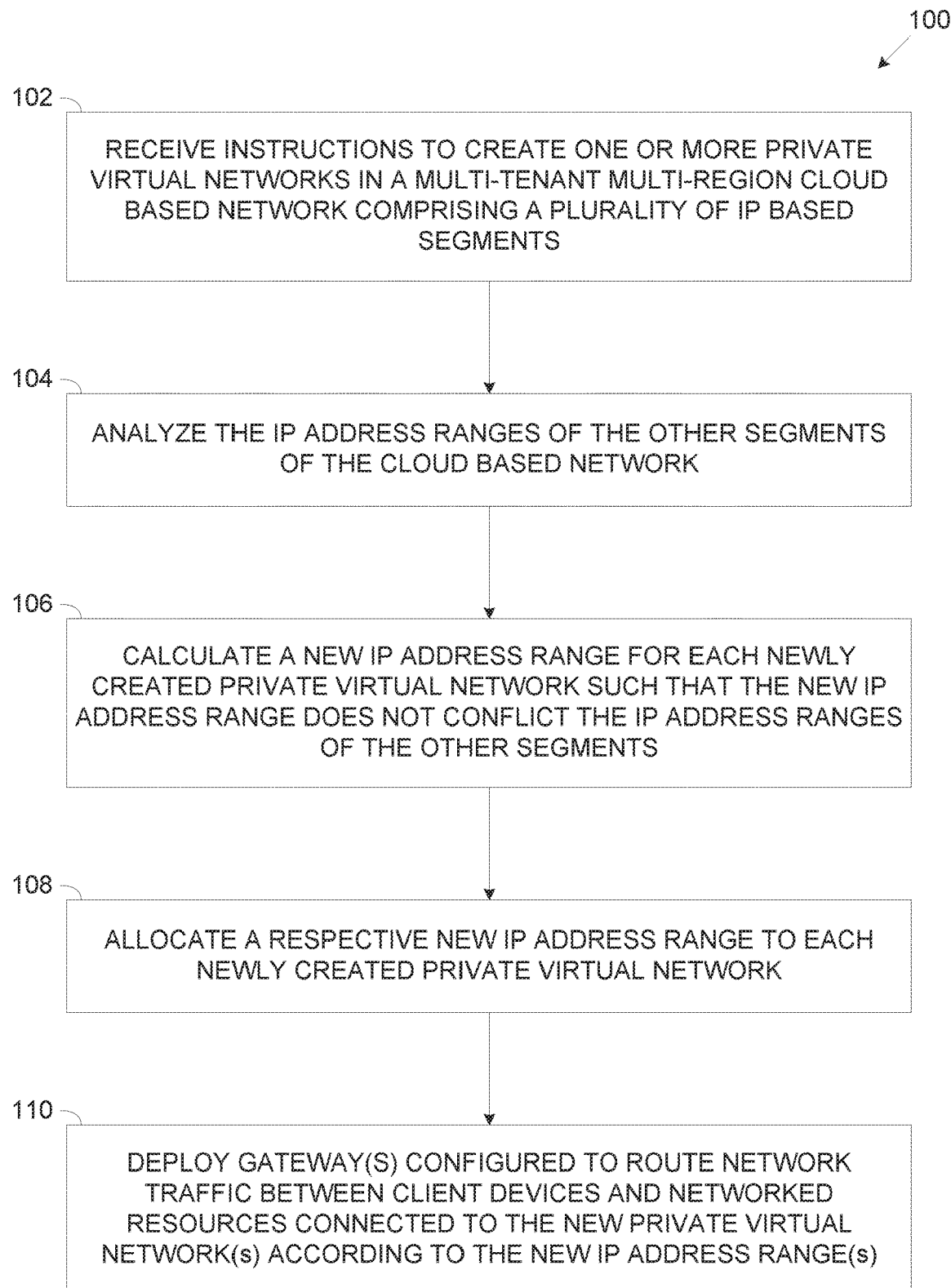
FIG. 1 is a flowchart of an exemplary process of creating a segmented multi-tenant multi-region cloud based network comprising multiple IP address based private virtual networks, according to some embodiments of the present invention.

The present invention, in some embodiments thereof, relates to constructing a segmented multi-tenant multi-region cloud based network, and, more specifically, but not exclusively, to constructing a segmented multi-tenant multi-region cloud based network comprising multiple IP address based private virtual networks to support L3 up to L7 networking infrastructure as a service for the private virtual networks.

According to some embodiments of the present invention, there are provided methods, systems, devices and computer program products for construing one or more cloud based networks, in particular multi-tenant networks supporting multi-tenancy, i.e. hosting a plurality of separate and isolated private virtual networks which are allocated to different entities, for example, companies, organizations, institutions and/or the like.

The multi-tenant cloud based network which may be utilized using one or more cloud platforms, services and/or infrastructures, for example, Network as a Service (NaaS) and/or the like may be therefore constructed as a segmented cloud based network comprising a plurality of segments isolated from each other which may thus serve as the private virtual networks. Furthermore, the cloud based networks may be constructed as multi-region networks providing connectivity to users located at a plurality of different geographical regions.

In particular, the plurality of segments (interchangeably referred to as the private virtual networks) may be constructed based on network addressing mapping, for example, Internet Protocol (IP) address mapping. Each of the plurality of segments may be allocated a respective unique IP address range (space) which is non-conflicting with the IP address ranges of any of the other segments.

One or more gateways, for example, multi-regional and distributed NaaS gateways optionally instantiated in virtualized environments across multiple regions may provide a plurality users using respective client devices connectivity and access to one or more of the private virtual networks (segments). Specifically, the gateway(s) may assign each such client device a respective IP address in the address range of the private virtual network that the user using the respective client device is authorized to access. The gateway(s) may then route network packets (traffic) between the respective client device and one or more other networked resources connected to the respective private virtual network, for example, another client device, a cloud based resource and/or the like based on the IP address mapping of the networked devices.

Since the segmentation is based on IP address mapping, the gateway(s) may apply one or more routing protocols, for example, Layer 2 (L2) routing and/or Layer 3 (L3) routing for routing the packets between their source and destination according to the source and destination IP addresses defined in each transmitted packet.

To support efficient connectivity to the multi-region cloud based network for a plurality of client devices located at different geographical regions, one or more of the gateways may be deployed in one or more edge servers located at an edge of the network in one or more of the geographical regions in close network proximity to one or more access points, for example, a router, a switch, a base station and/or the like which provide network connectivity and service to the client devices located in the respective geographical region(s).

Moreover, at least some of the gateways deployed in different geographical regions may be connected with each other via one or more site to site network links, specifically secure links, for example, a Virtual Private Network (VPN), a tunneling link and/or the like. Such site to site links may significantly improve the network performance between client devices located at different geographical regions and connected to different gateways, for example, reduce latency, increase bandwidth, increase security of the transmitted data and/or the like.

Furthermore, security measures may be applied to restrict access to the isolated segments in order to ensure segregation, privacy and/or security of the network resources, network traffic and/or data in each of the multiple private virtual networks (segments). The security measures, for example, one or more security engines such as, for example, a firewall, a next gen firewall optionally instantiated in the virtualized NaaS environment and/or the like may be configured to apply one or more security policies which may define access rights for a plurality of users of the private virtual networks. The access rights may define, for example, access rights to one or more networked resources connected to one or more of the private virtual networks, access, manipulation, creation, deletion and/or transfer privileges of one or more of the files stored in the private virtual networks and/or the like.

Since the segmentation of the cloud based network is based on IP address mapping, the security engine(s) may also process the network packets exchanged via the cloud based network and may apply the security policy(s) based on the IP address mapping. The security engine(s) may apply the security policy(s) for each intercepted packet according to the IP address identified in the packets, specifically the source IP address which may uniquely identify each client device and thus each user. The security engine(s) may further retrieve one or more of the security policies which are applicable for the respective user and may apply it to the respective intercepted packet.

In order to create one or more new private virtual networks in the cloud based network, the cloud based network may be further segmented to one or more respective additional segments. Each additional segment may be created by calculating a respective new IP address range which is non-conflicting (does not overlap) with any of the other IP address ranges allocated for the other segments of the cloud based network.

One or more gateways may be deployed automatically to support connectivity and access to the newly create private virtual networks for one or more of the client devices. The gateway(s) may be configured connect each authorized client device requesting to access a respective newly create private virtual network by assigning the client device an IP address in the IP address range of the respective newly create private virtual network. The gateway(s) may then route network packets exchanged between the client device and one or more of the other network resources connected to the respective newly create private virtual network based on the IP addresses of the nodes communicating with each other via the respective newly create private virtual network.

The gateway(s) deployed to support connectivity to one or more of the newly created private virtual networks may be deployed using existing gateways already deployed to support connectivity to one or more of the private virtual networks which are already created in the cloud based network. Such existing gateway(s) may be updated, adjusted and/or re-configured to further support the new IP address range(s) allocated to the newly created private virtual network(s). However, optionally, one or more of the gateway(s) deployed to support connectivity to one or more of the newly create private virtual networks may be deployed using one or more additional gateways, for example, a gateway instantiated in the NaaS virtualized environment.

According to some embodiments of the present invention, one or more network controllers are deployed in the cloud based network to monitor the nodes connected to the private networks, for example, the client devices and the network traffic exchanged over the private networks. The network controller(s) may automatically control the gateways deployed in the cloud based network, specifically according to an identified demand for connecting and/or accessing the private virtual networks. In particular, the network controller(s) may automatically deploy one or more additional gateways and/or remove (terminate) one or more of the deployed gateways in response to changes in the connectivity and/or access demand to the private virtual networks. For example, assuming the network controller(s) identifies an increase in the demand, for example, a large number of access requests are received from a plurality of additional client devices. In such the network controller(s) may deploy automatically one or more additional gateways to serve the increase in the connectivity demand. Each such additional gateway deployed to serve the increasing demand may be configured to route network packets according to the IP address range(s) of one or more of the private virtual networks which are the target of the additional client devices.

Moreover, the network controller(s) may deploy the additional gateway(s) in one or more of the geographical regions supported by the cloud based multi-region network according to the location of the additional client device(s) requesting to connect and access one or more of the private virtual networks of the cloud based network. As such, the additional gateway(s) may be deployed in one or more edge servers located in the respective geographical region(s) in which the requesting client device(s) is located.

Complementary, in case the connectivity demand is reduced, for example, only a few client devices are simultaneously connected to the private virtual networks, the network controller(s) may terminate (remove) automatically one or more of the gateways.

Constructing the private virtual networks as IP based segments of the cloud based network may present major benefits and advantages compared to existing methods for constructing and operating cloud based networks comprising isolated private virtual networks.

First, most if not all of the existing cloud based networks are segmented to support multi-tenancy by processing, controlling and routing the network packets in one or more high layers of the Open Systems Interconnection model (OSI model), for example, in layers 3 to 7. Processing the network packets at such high layers to identify its source (origin) and destination and route the packet accordingly may require significantly increased computing resources, for example processing resources, processing time, storage resources and/or the like. Moreover, the increased processing time may significantly increase the latency and/or travel time of one or more of the packets. In contrast, the IP based segmentation of the cloud based network may enable the deployment of simple, efficient, low end gateways applying low layer L2 and/or L3 routing to form the segmentation while ensuring the isolation and segregation of each segment from all other segments thus significantly reducing the required computing resources. Moreover, the L2/L3 routing applied by the gateways as known in the art is highly efficient and fast thus reducing the latency and/or travel time of the routed packets.

Moreover, while some of the existing cloud based networks may require complex, resource intensive and optionally custom design security measures to enforce the isolation of the private virtual networks, applying the IP based segmentation may allow the use of existing advanced and highly powerful security measures such, as, for example, the firewall, the next generation firewall and/or the like to apply the security polices in the IP, L2 and/or L3 layers. Using the existing security measures may redundant the need to develop and/or deploy complex and/or resource intensive security measures thus further reducing the computing resources required to route the packets to their destination private virtual networks according to the IP based segmentation of the cloud based network.

Furthermore, since the IP based security measures are commonly deployed in existing systems, networks and/or platforms, specifically cloud based systems, may enable easy, simple and expedited adoption of the IP based segmentation in the cloud based networks.

In addition, automatically deploying and/or terminating the gateways according to the connectivity and/or access demand may enable significant and extreme scaling of the IP based segmented cloud based network since gateways may be easily deployed and/or terminated according to the demand thus adjusting to serve the current demand at every given moment. This may significantly increase the service quality, in terms of, for example, improved quality of service, reduced latency, increased bandwidth and/or the like during high demand times while reducing redundant expenses and waste of computing resources during low demand times.

Also, since the gateways and network are managed by the network controller (singleton), all the network nodes (e.g. client devices) and/or security policies may be centrally orchestrated to allow enforcing user and/or device centric security regardless of the physical geolocation of the users and/or client devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
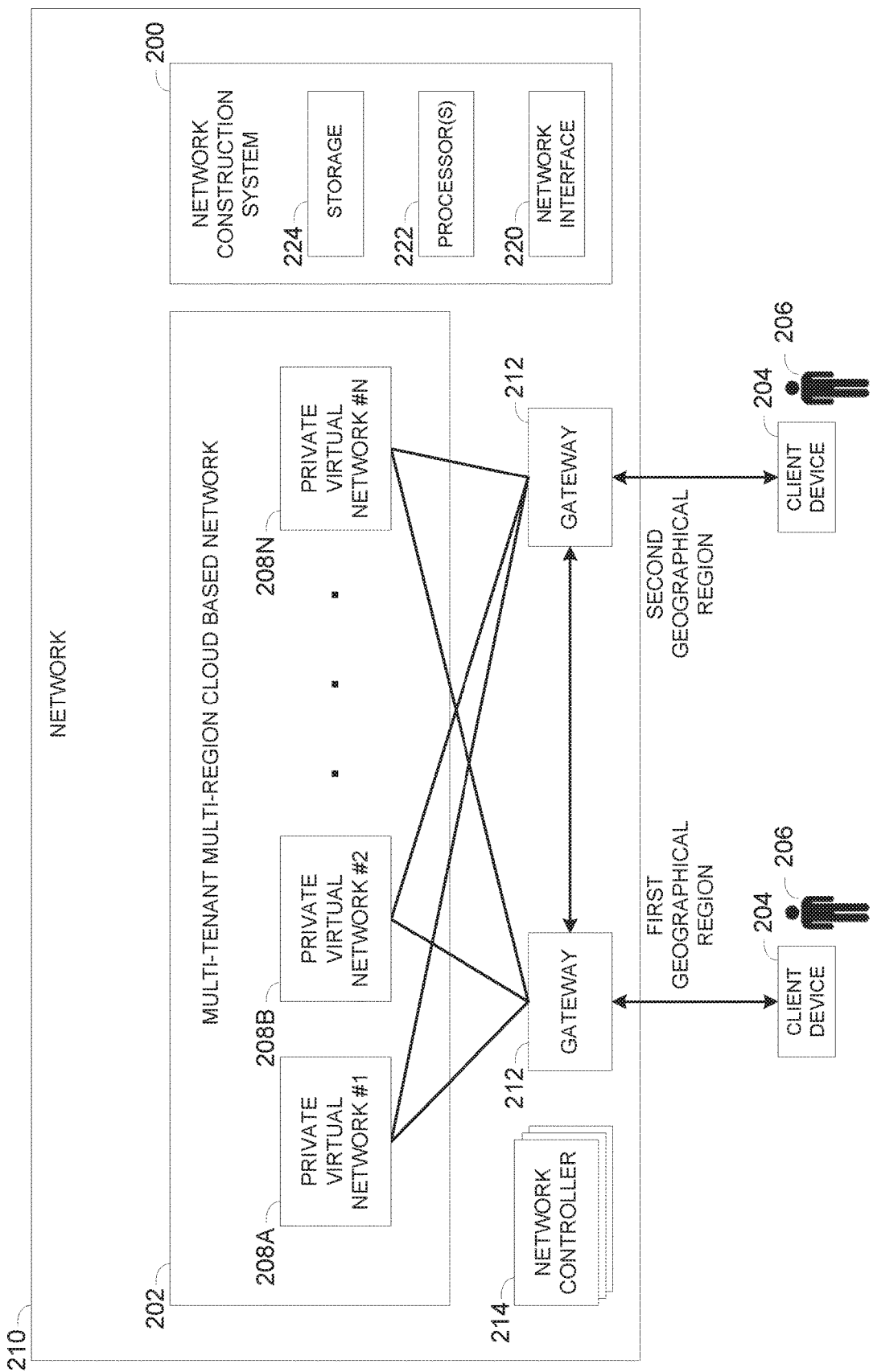
FIG. 2 is a schematic illustration of an exemplary system for creating a segmented multi-tenant multi-region cloud based network comprising multiple IP address based private virtual networks, according to some embodiments of the present invention.

Referring now to the drawings, FIG. 1 illustrates a flowchart of an exemplary process of creating a segmented multi-tenant multi-region cloud based network comprising multiple IP address based private virtual networks, according to some embodiments of the present invention. Reference is also made to FIG. 2, which is a schematic illustration of an exemplary system for creating a segmented multi-tenant multi-region cloud based network comprising multiple IP address based private virtual networks, according to some embodiments of the present invention.

An exemplary process 100 may be executed by an exemplary network construction system 200 to creates one or more cloud based network 202, specifically a segmented cloud based network 202 deployed within and/or accessible via a network 208 for example, a Local Area Network (LAN), a Wireless LAN (WLAN), a Wide Area Network (WAN), a Municipal Area Network (MAN), a cellular network, the internet and/or the like.

The network construction system 200 may construct the cloud based network 202 from a plurality of segments which may serve as a plurality of private virtual networks 208, for example, a first virtual network 208A, a second private virtual network 208B and so on to a $N^{th}$ private virtual network 208N. The terms segment of the cloud based network 202 and private virtual network 208B are therefore used interchangeably herein after.

The network construction system 200 may construct and segment the cloud based network 202 by allocating a respective network address space, specifically a respective IP address space to each of the plurality of private virtual networks 208 such that each private virtual network 208 is exclusively identified and accessed by its respective IP address space.

The segmented cloud based network may be thus constructed to serve as a multi-tenant network which may host a plurality of tenants, for example, companies, organizations, institutions, private users and/or the like such that each private virtual network, i.e., each segment may be accessible only by a respective one of the tenants.

Optionally, one or more of the cloud based networks 202 which are typically virtual networks may be utilized using one or more cloud services, platforms and/or infrastructures, for example, NaaS.

A plurality of users 206 may use a plurality of respective client devices 204, for example, a server, a computer, a mobile device (e.g., Smartphone, tablet, etc.), a wearable device (e.g., smart watch, goggles, etc.) to connect to a network 210 comprising one or more wired and/or wireless networks, for example, a Local Area Network (LAN), a Wireless LAN (WLAN), a Wide Area Network (WAN), a Municipal Area Network (MAN), a cellular network, the internet and/or the like. One or more of the client devices 204 may further include a site local network which connects to the network 210 via one or more network infrastructure apparatuses, for example, a router, a gateway and/or the like.

One or more gateways 212 may be therefore deployed to provide access to the cloud based networks 202 for one or more of the client devices 204 used by the respective users 206 which connect to the gateway(s) 212 via the network 210. Specifically, the gateway(s) 212 may provide the plurality of client devices 204 access and connectivity to one or more of the segments of the cloud based network(s) 202, i.e. to one or more of the private virtual networks 208.

The network construction system 200, for example, a server, a computing node, a cluster of computing nodes and/or the like may include a network interface 220 for communicating with one or more networked resources connected to the network 210, to the cloud based network 202 and/or the like, a processor(s) 222 for executing the process 100 and a storage 224 for storing code (program store) and/or data.

The processor(s) 222 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 224 and executed by one or more processors such as the processor(s) 222. The processor(s) 22 may further include, utilize and/or otherwise facilitate one or more hardware modules (elements), for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU), a network processor and/or the like.

The network construction system 200, especially the processor(s) 222 may therefore execute one or more functional modules utilized by one or more software modules, one or more of the hardware modules and/or a combination thereof. For example, the network construction system 200 may execute one or more functional modules for executing the process 100 to create, adjust and/or update the segmented cloud based network 202, for example, create one or more new private virtual networks 208, adjust one or more of the private virtual networks 208, deploy one or more additional gateways to provide connectivity for the client devices 204 to the private virtual networks 208 and/or the like.

Optionally, the network construction system 200 may be utilized by a Virtual Machine (VM) instantiated over one or more physical computing devices such as, for example, a computer, a server, a computing node, a cluster of computing nodes and/or the like. Moreover, the network construction system 200 may be optionally implemented using one or more cloud computing services, platforms and/or applications, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

One or more of the gateways 212 may be implemented using physical computing nodes, for example, a computer, a server, a computing node, a cluster of computing nodes and/or the like. However, one or more of the gateways 212 may be implemented using one or more VMs instantiated using resources, for example, computing resources, storage resources, networking resources and/or the like provided by one or more physical computing nodes and/or by one or more of cloud platforms, services and/or applications, for example, the NaaS and/or the like.

Moreover, one or more of the gateways 212 may be deployed in one or more edge servers connected at an edge of the network 210 in close network proximity to one or more access points, for example, a router, a switch and/or the like providing network connectivity to the client devices 204. In particular, the cloud based networks 202 may be constructed as a multi-region network by deploying the gateways 212 in a plurality of edge servers located at a plurality of geographical regions. As such each gateway 212 may be deployed in respective one or more edge servers located in a respective one of the plurality of geographical regions in close network proximity to the respective access point(s) providing network connectivity to the client devices 204 located in the respective geographical region.

The plurality of gateways 212 deployed in different geographical may be connected with each other via one or more communication links established over the network 210 and/or the cloud based network 202. In particular, the plurality of gateways 212 may be connected via one or more secure communication links, for example, a site to site secure link such as, for example, a site to site Virtual Private Network (VPN), a site to site tunneling link and/or the like.

One or more security engines may control access rights, privileges and or the like of the users 206 to resources connected to one or more of the private virtual networks 208, for example, a firewall and/or the like. One or more of the security engines may be implemented using physical computing nodes, for example, a server, a computer and/or the like configured to execute one or more functional modules utilized by one or more software modules, one or more of the hardware modules and/or a combination thereof. However, one or more of the security engines may be implemented using one or more VMs instantiated using resources, for example, computing resources, storage resources, networking resources and/or the like provided by physical computing nodes and/or by one or more of the cloud platforms, services and/or applications, for example, the NaaS and/or the like. Moreover, one or more of the security engines may be integrated in one or more of the gateways 212.

The security engine(s) may be service centric and thus IP centric such that they may control the access rights and privileges of the network traffic (packets) based on the address of the source network node, i.e., the IP address identified in the source address field of each incoming packet. To this end each security engine may store and maintain one or more IP based access rights records for example, a table, a file, a database and/or the like which correlate each IP address with respective one of a plurality of security policies defining the access rights for the respective IP address.

Access to the private virtual networks 208 which are defined and segmented by their IP address range may be therefore controlled by the security engines based on the IP address range allocated to each of the private virtual networks 208.

Moreover, one or more network controllers 214 may be deployed to control, manage and/or orchestrate the network activity, routing, security, access control and/or the like in the plurality of private virtual networks 208 implemented as segments of the cloud based network 202. For example, the network controller(s) 214 may identify the client devices 204 and/or the users 206 and may operate, configure and/or otherwise instruct the gateways 212 and/or the security engines to apply routing schemes and/or security policies accordingly, i.e., according to the identity of the users 206 and/or the client devices 204. This means that while the client devices 204 may be located in different geographical locations (geolocations) and thus assigned different IP addresses, the network controller(s) 214 may identify the users 206 and/or their respective client devices 204 and apply the appropriate routing schemes and/or security policies applicable for these users 206 and/or client devices 204 regardless of their origin IP address.

The network controller(s) 214 may be implemented using one or more physical computing nodes, for example, a server, a computer and/or the like configured to execute one or more functional modules utilized by one or more software modules, one or more of the hardware modules and/or a combination thereof. Optionally, one or more of the network controller(s) 214 may be implemented using one or more VMs instantiated using resources, for example, computing resources, storage resources, networking resources and/or the like provided by physical computing nodes and/or by one or more of the cloud platforms, services and/or applications, for example, the NaaS and/or the like. Moreover, one or more of the security engines may be integrated in one or more of the gateways 212.

As shown at 102, the process 100 starts with the network construction system 200 receiving instructions to create one or more (new) private virtual networks 208 in the multi-tenant multi-region cloud based network 202.

The instructions may further define one or more operational parameters of one or more of the new private virtual networks 208, for example, a size of the respective private virtual networks 208 in terms of how many unique network addresses, specifically how many unique IP addresses may be allocated to networked resources, for example, client device 204 connected simultaneously to the respective private virtual networks 208.

The instructions may be received, for example, from one or more of the tenants registered to the service of the cloud based network 202 and wishing to establish a new private virtual network 208 for their use. In another example, the instructions may originate from one or more operators of the cloud based network 202 who may wish to segment the cloud based network 202 for one or more purposes, for example, create an infrastructure for creating one or more additional private virtual networks 208 for use by one or more existing and/or new tenants and/or the like. In another example, the instructions may be generated automatically, optionally by the network construction system 200, for example, to balance the segmentation of the cloud based network 202 by offloading networked resources connected to a single private virtual network 208 to connect to multiple new private virtual networks 208 and/or the like.

As shown at 104, the network construction system 200 may analyze the network address mapping of the plurality of segments of the cloud based network 202. Specifically, the network construction system 200 may analyze the IP address mapping, i.e. the IP address range allocated to each of the plurality of segments of the cloud based network 202.

Based on the analysis, the network construction system 200 may create a map of the IP address ranges (spaces) allocated to each of the plurality of segments of the cloud based network 202.

As shown at 106, the network construction system 200 may calculate one or more new IP address ranges which do not conflicting with any of the other IP address ranges of the plurality of segments of the cloud based network 202. The network construction system 200 may calculate a new non-conflicting IP address range for each new private virtual network 208 whose creation is instructed in the received instructions.

For example, assuming, a first segment of the cloud based network 202, for example, the first private virtual network 208A is allocated an IP address range 192.168.xxx.xxx, a second segment of the cloud based network 202, for example, the second private virtual network 208B is allocated an IP address range 4.2.2.xxx and a third segment of the cloud based network 202 is allocated an IP address range 212.8.xxx.xxx. In such case, the network construction system 200 may calculate the new IP address range to be 172.16.xxx.xxx.

Moreover, the network construction system 200 may calculate the new IP address range according to one or more of the operational parameters of one or more of the private virtual networks 208 to be created as defined by the instructions, for example, the required size of the respective private virtual network 208. For example, assuming the size of a certain new private virtual network 208 defined by the instructions is 200, i.e. the certain new private virtual network 208 needs to be able to host up to 200 client devices 204 simultaneously. In such case the network construction system 200 may calculate the new IP address range to be 172.16.0.xxx. In another example, assuming the size of a certain new private virtual network 208 defined by the instructions is 200, i.e. the certain new private virtual network 208 needs to be able to host up to 16,000 client devices 204 simultaneously. In such case the network construction system 200 may calculate the new IP address range to be 172.16.xxx.xxx.

As shown at 108, the network construction system 200 may allocate a respective new IP address range to each of the new private virtual networks 208 thus creating each new private virtual network(s) 208 as an additional segment of the cloud based network 202.

As shown at 110, the network construction system 200 may deploy automatically one or more gateways 212 configured to connect one or more of the client devices 204 to one or more of the newly created private virtual network(s) 208.

The network construction system 200 may deploy the gateway(s) 212 by instantiating one or more new gateway(s) 212 and/or by adjusting, updating and/or otherwise reconfiguring one or more existing gateways 212 which are already deployed to control network traffic packets transmitted via the cloud based network 202.

When a certain client device 204 attempts to connect to a certain private virtual network 208, assuming the user 206 of the certain client device 204 is an authorized user having access rights to the certain private virtual network 208, the gateway(s) 212 may be configured to assign the certain client device 204 an IP address in the IP address range of the certain private virtual network 208.

The gateway(s) 212 may be therefore configured to apply each new IP address for the respective newly created private virtual network 208 such that when an authorized client device 204 access the respective newly created private virtual network 208, the gateway(s) 212 may assign the authorized client device 204 an IP address the IP address range of the newly created private virtual network 208.

Since network mapping of the networked resources connected to the newly created private virtual network 208 are based on IP addressing, after connecting one or more of the client devices 204 to one or more of the newly created private virtual network 208, the gateway(s) 212 may apply IP routing as known in the art for routing network packets exchanged between networked resources, for example, client devices 204 connected to the newly created private virtual network 208. For example, the gateway(s) 212 may apply one or more L2 routing protocols for routing the packets exchanged between the networked resources connected to the newly created private virtual network 208. In another example, the gateway(s) 212 may apply one or more L3 routing protocols for routing the packets exchanged between the networked resources connected to the newly created private virtual network 208.

One or more of the security engines, for example the firewall associated with the gateway(s) 212 may be also configured to prevent unauthorized users from accessing these private virtual network(s) 208. The security engine(s) may further configured to apply one or more security policies for securing the newly created private virtual network(s) 208 and allowing access only to authorized client devices 204 correlated with access rights to the newly created private virtual network(s) 208. Moreover, since the security engines may be IP centric and apply the security policy(s) based on the source IP of each intercepted packet transmitted via the cloud based network 202, the security engines may be easily adapted and/or adjusted to apply the security policy(s) for network packets exchanged via the newly created private virtual network(s) 208 which are constructed as IP address based segments of the cloud based network 202.

Moreover, each of one or more of the plurality of segments of the cloud based network 202, i.e. each of one or more of the private virtual networks 208 may be further segmented to a plurality of subnets. Since the private virtual networks 208 are constructed as IP address based segments of the cloud based network 202, each of the one or more of the segments may be further segmented according to one or more protocol, conventions and/or implementation as known in the art for creating the subnets.

For example, the gateway(s) 212 may be configured to further apply net masks as known in the art for routing network packets exchanged between networked nodes via one or more of the private virtual networks 208 such that each of these private virtual network(s) 208 may include multiple subnets. The gateway(s) 212 may thus apply the net masking for routing network packets via the respective private virtual network 208. One or more of the security engines, for example, the firewall may then further route the network traffic (packets) within the respective segment, i.e., within the respective private virtual network 208 according to one or more routing tables which may be optionally associated with one or more security policies defining the access rights of the users 206 and hence of their associated client devices 204 to the subnets. In another example, the gateway(s) 212 may apply one or more Classless Inter Domain Routing (CIDR) protocols as known in the art to segment one or more of the private virtual networks 208 to a plurality of subnets and route accordingly the network packets transmitted via the respective private virtual network 208.

Since the cloud based network 202 may be constructed as a multi-region cloud network, the network construction system 200 may deploy automatically one or more of the gateways 212 configured to route traffic to the newly created private virtual networks 208 in one or more of the plurality of geographical regions supported by the cloud based network 202. For example, assuming the instructions indicate that one or more client devices 204 which need to connect to a newly created private virtual network 208 are located in a first geographical region (e.g. Paris, France), the network construction system 200 may deploy one or more of the gateways 212 configured to route traffic to the newly created private virtual networks 208 in one or more edge servers located at the first geographical region.

According to some embodiments of the present invention, the network controller(s) 214 may control the deployment of the gateways 212 connecting the client devices 204 to the cloud based network 202 according to demand, specifically according to connectivity demand and/or network traffic volume demand thus enabling high scalability of the cloud based network 202 and the private virtual networks 208. For example, the network controller(s) 214 may deploy automatically one or more additional gateways 212 to increase the serving capacity of the gateways 212 in response to one or more requests received from one or more additional client devices 204 to connect to one or more of the private virtual networks 208 of the cloud based network 202. In another example, the network controller(s) 214 may deploy automatically one or more additional gateways 212 to increase the serving capacity of the gateways 212 in case large volumes of a network traffic (packets) are exchanged through the gateways 212 between the client devices 204. In another example, the network controller(s) 214 may remove (terminate) automatically one or more gateways 212 providing connectivity to one or more of the private virtual networks 208 in case a low connectivity demand is identified, i.e., very few client devices 204 are currently connected and/or request to connect to the private virtual network(s) 208.

The network controller(s) 214 may configure the additional gateway(s) 212 to connect one or more of the additional client device 204 to one or more segments of the cloud based network 202, i.e., to one or more of the private virtual networks 208 by assigning each additional client device 204 an IP address in the IP address range of the respective segment. The gateway(s) 212 may then route network packets exchanged between the respective client device 204 and one or more other resources connected to the respective private virtual network 208 based on the mapping of the IP address range allocated to the respective private virtual network 208.

The network controller(s) 214 may deploy one or more of the additional gateways 212 according to one or more predefined rules defining one or more operational parameters of the private virtual networks 208 and/or of the gateways 212 from which scalability may be derived. For example, one or more of the predefined rules may define a maximum number of client devices 204 which are simultaneously connected to one or more of the private virtual networks 208 via a single gateway 212. In case one or more connection requests are received from one or more additional client devices 204, the network controller(s) 214 may therefore deploy automatically one or more additional gateways 212 to support connectivity of the additional client device(s) 204 to the private virtual network(s) 208. In another example, one or more of the predefined rules may define that one or more gateways 212 need to be deployed as close as possible to the geographical location in which the additional client devices 204 are located. Therefore, assuming a plurality of the additional client devices 204 requesting to connect to one or more of the private virtual networks 208 are located in a second geographical region (e.g., Milano, Italy), the network controller(s) 214 may deploy automatically one or more of the additional gateways 212 in one or more edge servers located in the second geographical region to support connectivity of the additional client devices 204 to one or more of the private virtual networks 208. Moreover, in case no such edge servers are available in the second geographical region, the network controller(s) 214 may deploy automatically one or more of the additional gateways 212 in one or more edge servers located in a nearby third geographical region (e.g. Torino, Italy) to support connectivity of the additional client devices 204 located in the second geographical region to one or more of the private virtual networks 208

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms IP based routing protocols and IP based security measures are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A system for configuring a segmented cloud based network based on separate Internet Protocol (IP) segments, comprising:
    at least one processor configured to:
    receive instructions to create at least one additional private virtual network in at least one multi-tenant multi-regional cloud based network segmented to a plurality of segments by adding a respective additional segment to the plurality of segments, each of the plurality of segments is mapped by a respective IP address range which is non-conflicting with the IP address range of any other of the plurality of segments;
    calculate a new IP address range which is non-conflicting with the IP address range of any of the plurality of segments based on analysis of the IP address range of each of the plurality of segments;
    allocate the new IP address range to map the respective additional segment; and
    deploy automatically at least one gateway configured to connect at least one of a plurality of client devices to the respective additional segment by assigning the at least one client device an IP address in the new IP address range and routing network packets between the at least one client device and the respective additional segment according to mapping of the new IP address range.

2. The system of claim 1, wherein the at least one gateway is configured to apply Layer 2 (L2) routing to route the network packets between the at least one client device and the respective additional segment.

3. The system of claim 1, wherein the at least one gateway is configured to apply Layer 3 (L3) routing to route the network packets between the at least one client device and the respective additional segment.

4. The system of claim 1, wherein at least one of the plurality of segments is further segmented to a plurality of subnets using Classless Inter-Domain Routing (CIDR).

5. The system of claim 1, wherein at least one of the plurality of segments is further segmented to a plurality of subnets using at least one firewall configured to route network traffic within the at least one segment according to at least one routing table.

6. The system of claim 1, wherein a plurality of gateways are deployed to provide connectivity to at least one of the plurality of segments for a plurality of client devices located at a plurality of geographical regions.

7. The system of claim 6, wherein each of the plurality of gateways is deployed in at least one respective edge server connected at an edge of the network in a respective one of the plurality of geographical regions in close network proximity to a respective access point providing network connectivity to the client devices located in the respective geographical region.

8. The system of claim 7, wherein the plurality of gateways providing connectivity to the at least one segment for client devices located in the plurality of geographical regions are interconnected via at least one site to site secure connection.

9. The system of claim 1, wherein the at least one processor is further configured to deploy automatically at least one additional gateway according to at least one predefined rule in response to a request received from at least one additional client device to connect to at least one of the plurality of segments.

10. The system of claim 9, wherein the at least one additional gateway is configured to connect the at least one additional client device to the at least one segment by assigning the at least one additional client device an IP address in the IP address range of the at least one segment and routing network packets between the at least one additional client device and the at least one segment according to the mapping of the IP address range allocated to the at least one segment.

11. The system of claim 9, wherein the at least one additional gateway is deployed in at least one of a plurality of geographical regions supported by the at least one cloud based network in which the at least one additional client device is located.

12. A computer implemented method of configuring a segmented cloud based network based on separate Internet Protocol (IP) segments, comprising:
using at least one processor configured for:
receiving instructions to create at least one additional private virtual network in at least one multi-tenant multi-regional cloud based network segmented to a plurality of segments by adding a respective additional segment to the plurality of segments, each of the plurality of segments is mapped by a respective IP address range which is non-conflicting with the IP address range of any other of the plurality of segments;
calculating a new IP address range which is non-conflicting with the IP address range of any of the plurality of segments based on analysis of the IP address range of each of the plurality of segments;
allocating the new IP address range to map the respective additional segment; and
deploying automatically at least one gateway configured to connect at least one of a plurality of client devices to the respective additional segment by assigning the at least one client device an IP address in the new IP address range and routing network packets between the at least one client device and the respective additional segment according to mapping of the new IP address range.

13. A computer program with a program code for configuring a segmented cloud based network based on separate Internet Protocol (IP) segments, comprising a non-transitory medium storing thereon computer program instructions which, when executed by at least one hardware processor, cause the at least one hardware processor to:
receive instructions to create at least one additional private virtual network in at least one multi-tenant multi-regional cloud based network segmented to a plurality of segments by adding a respective additional segment to the plurality of segments, each of the plurality of segments is mapped by a respective IP address range which is non-conflicting with the IP address range of any other of the plurality of segments;
calculate a new IP address range which is non-conflicting with the IP address range of any of the plurality of segments based on analysis of the IP address range of each of the plurality of segments;
allocate the new IP address range to map the respective additional segment; and
deploy automatically at least one gateway configured to connect at least one of a plurality of client devices to the respective additional segment by assigning the at least one client device an IP address in the new IP address range and routing network packets between the at least one client device and the respective additional segment according to mapping of the new IP address range.

* * * * *